July 17, 1956 W. S. DRUZ 2,755,332

SUBSCRIPTION TELEVISION SYSTEM

Filed April 20, 1950 6 Sheets-Sheet 1

WALTER S. DRUZ
*INVENTOR.*

BY Francis W. Crotty
HIS ATTORNEY

WALTER S. DRUZ
*INVENTOR.*

BY Francis W. Crotty
HIS ATTORNEY

July 17, 1956 W. S. DRUZ 2,755,332

SUBSCRIPTION TELEVISION SYSTEM

Filed April 20, 1950 6 Sheets-Sheet 3

WALTER S. DRUZ
*INVENTOR.*

BY Francis W. Crotty
HIS ATTORNEY

SUBSCRIPTION TELEVISION SYSTEM

Filed April 20, 1950 6 Sheets-Sheet 4

WALTER S. DRUZ
*INVENTOR.*

BY Francis W. Crotty
HIS ATTORNEY

July 17, 1956 W. S. DRUZ 2,755,332

SUBSCRIPTION TELEVISION SYSTEM

Filed April 20, 1950 6 Sheets-Sheet 5

WALTER S. DRUZ
*INVENTOR.*

BY Francis W. Crotty
HIS ATTORNEY

July 17, 1956 W. S. DRUZ 2,755,332

SUBSCRIPTION TELEVISION SYSTEM

Filed April 20, 1950 6 Sheets-Sheet 6

WALTER S. DRUZ
INVENTOR.

BY Francis W. Crotty
HIS ATTORNEY 2,755,332

SUBSCRIPTION TELEVISION SYSTEM

Walter S. Druz, Chicago, Ill., assignor to Zenith Radio Corporation, a corporation of Illinois Application April 20, 1950, Serial No. 157,075

9 Claims. (Cl. 178—5.1)

Figure 1:
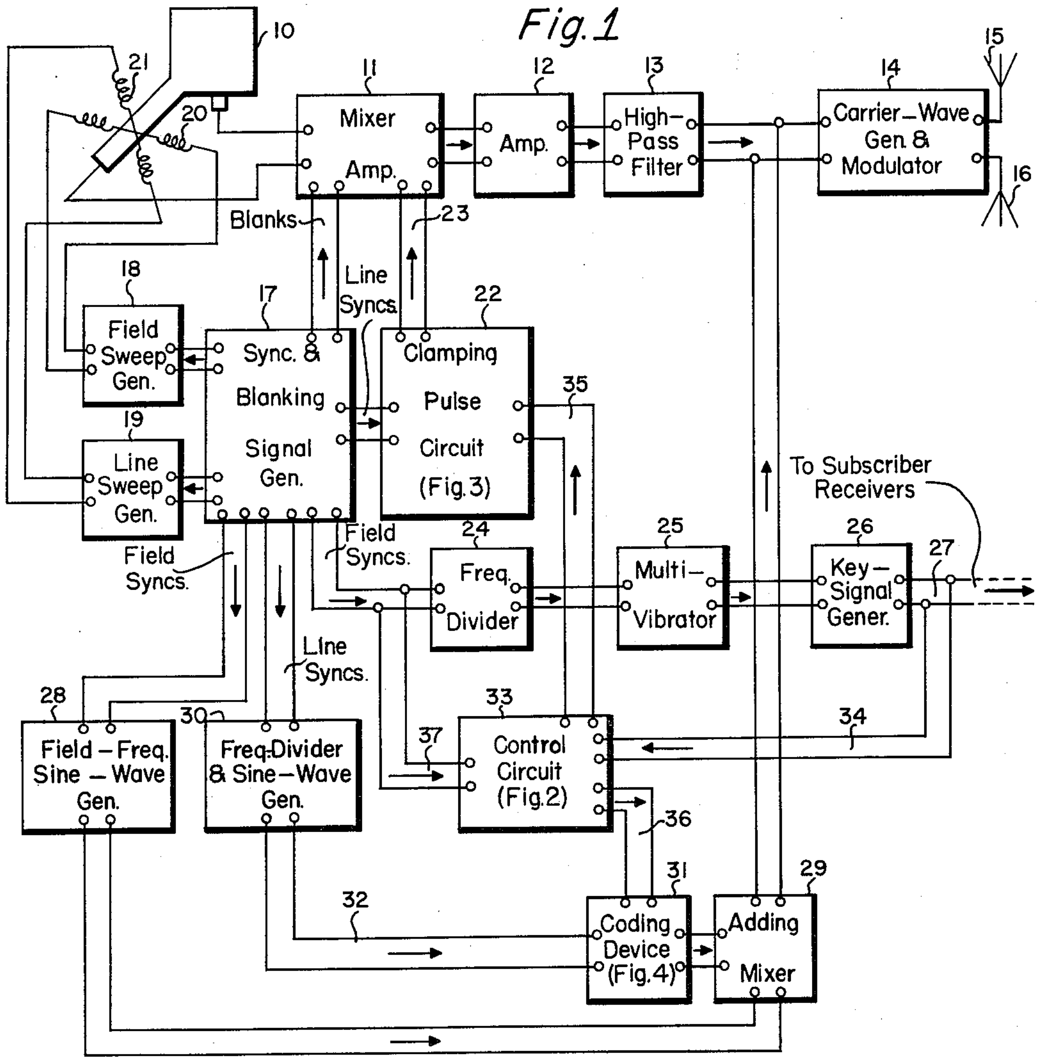

This invention relates to television signalling systems of the subscription type in which a television signal is transmitted in coded or scrambled form and a key signal for decoding the coded television signal is transmitted to subscriber receivers.

Subscription television systems are disclosed in Patent 2,510,046, Ellett et al., issued May 30, 1950, entitled "Radio Wire Signalling Systems" and in Patent 2,547,598, Roschke, issued April 3, 1951 entitled, "Image Transmission System," both assigned to the present assignee. This invention provides a subscription television system of the general type disclosed in these patents and one in which the television signal is coded with an exceedingly high degree of complexity so that it is most difficult for unauthorized receivers to decode and utilize the signal. Moreover, in accordance with this invention, the coding function does not affect the scanning process of the transmitter picture tube and may, therefore, be accomplished at a point remote from the origin of the television signal. For example, a television signal representing a certain program may originate in one locality and may be transmitted in uncoded form over a coaxial cable, micro-wave link or other means to another locality where the coding apparatus of this invention may be positioned and utilized to retransmit this signal in coded form to the surrounding area.

The transmitter of the present invention includes a video-signal source which may be a picture-converting device. The video signal derived from this source is passed through a high-pass filter to remove all frequency components below a preselected value, for example, below 10 kilocycles. The remaining frequency components of the video signal are modulated on a picture carrier and transmitted to subscriber receivers. The field-synchronizing components of the television signal are transformed into a continuous wave-signal, for example, a sine wave. In accordance with present-day standards this sine wave has a frequency of 60 cycles. The line-synchronizing components of the television signal, which by present-day standards have a frequency of 15,750 cycles, are frequency divided to a value, for example, of 7875 cycles and then transformed into a continuous wave, such as a sine wave. The sine wave representing the line-synchronizing components may be coded by altering some characteristic thereof, in a manner to be described. The coded line-synchronizing sine wave and the field-synchronizing sine wave are then combined and modulated on the picture carrier. Since the highest frequency of the synchronizing waves is below the lowest frequency of the transmitted video components, the synchronizing information may be conveniently separated from the video information at subscriber receivers. Line- and field-blanking pulses are also transmitted with the video components, but the amplitude of the blanking pulses is established at a lower level than the maximum amplitude range devoted to the video components in the transmitted signal so that unauthorized synchronization on the blanking pulses is precluded. To enable subscriber receivers to reinsert the low-frequency video components which are removed at the subscription transmitter, clamping pulses are transmitted superposed on the blanking pulses, the timing of the clamping pulses being altered from time to time to prevent unauthorized synchronization thereon. A key signal, indicating the coding schedule of the line-synchronizing signal, is transmitted to subscriber receivers.

It is, accordingly, an object of the present invention to provide an improved subscription signalling system in which a television signal, coded with a high degree of complexity, is transmitted and a key signal indicating the coding schedule of the television signal is transmitted to subscriber receivers.

It is a further object of the invention to provide an improved subscription television transmitter and an improved subscription television receiver for use in such a system.

Figure 2:
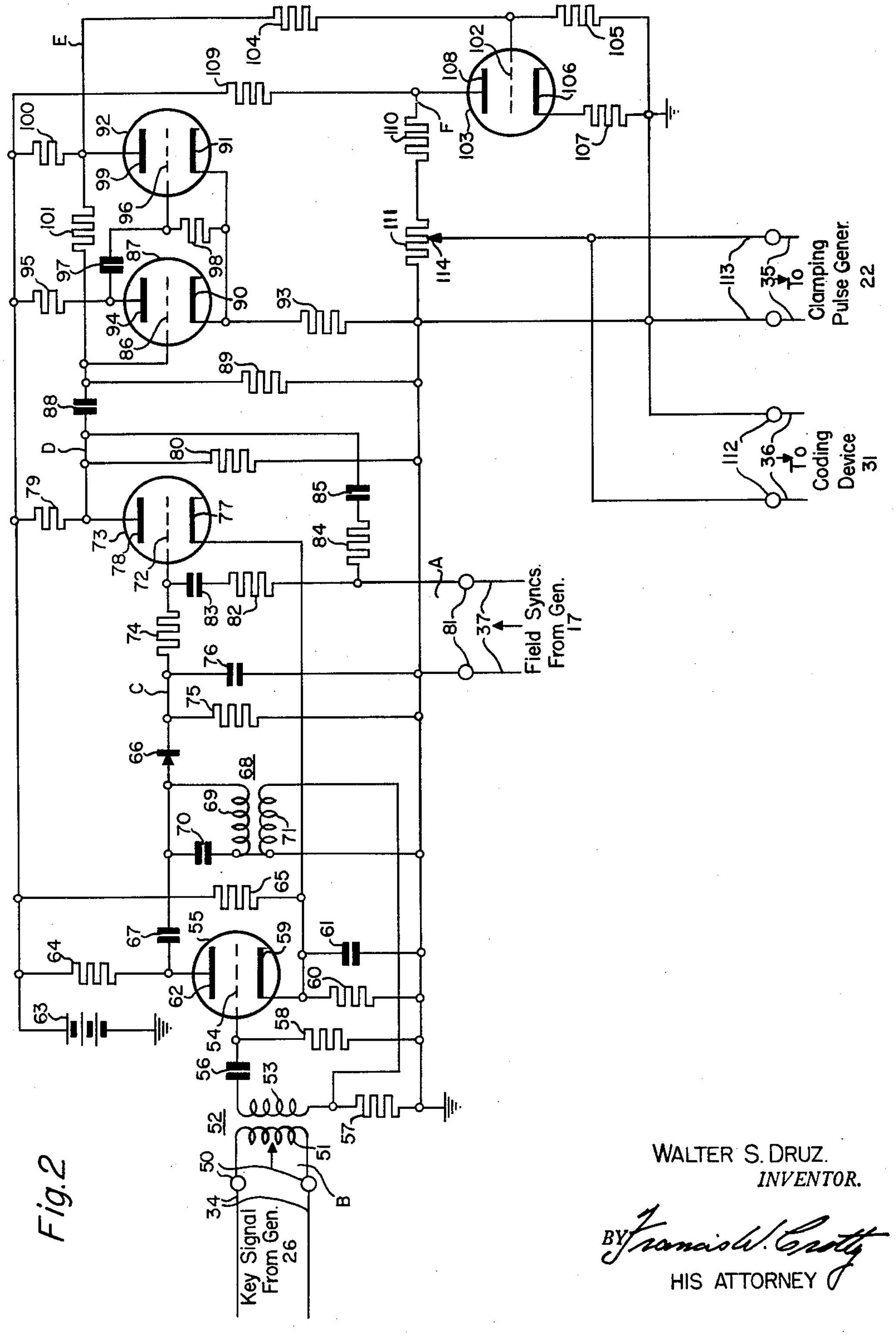
Figure 2A:
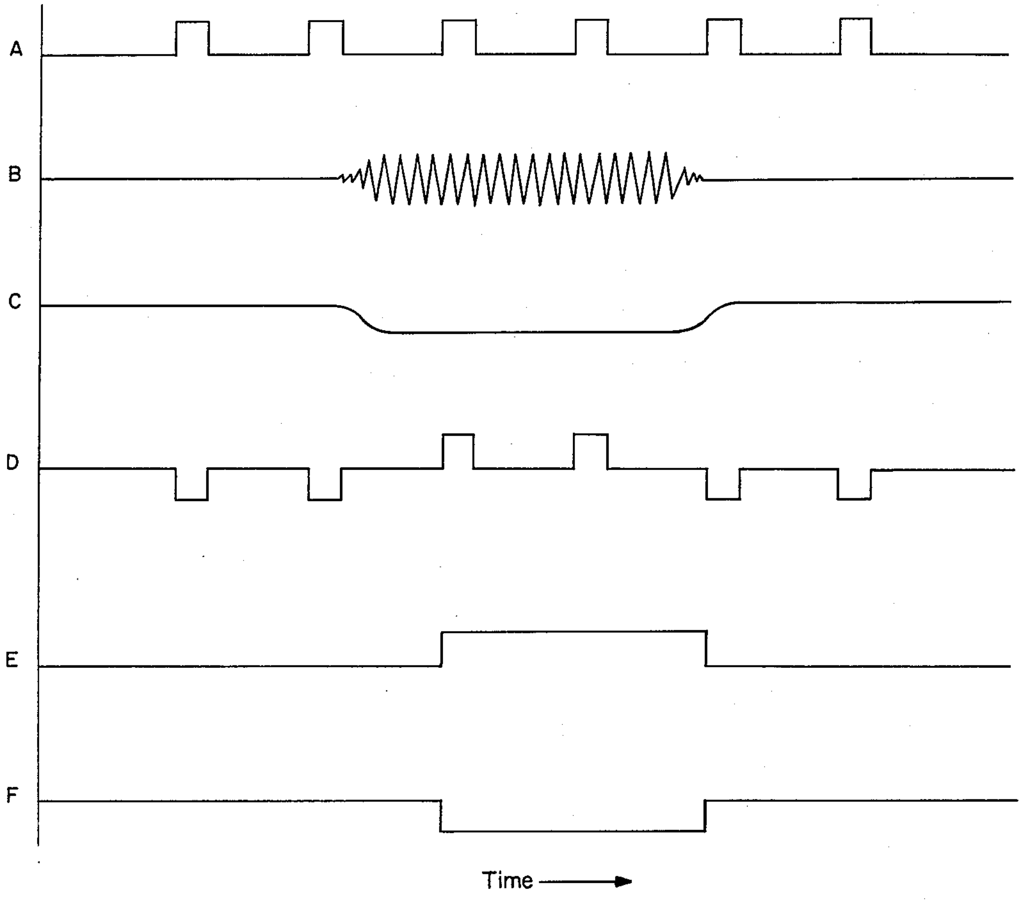
Figure 3:
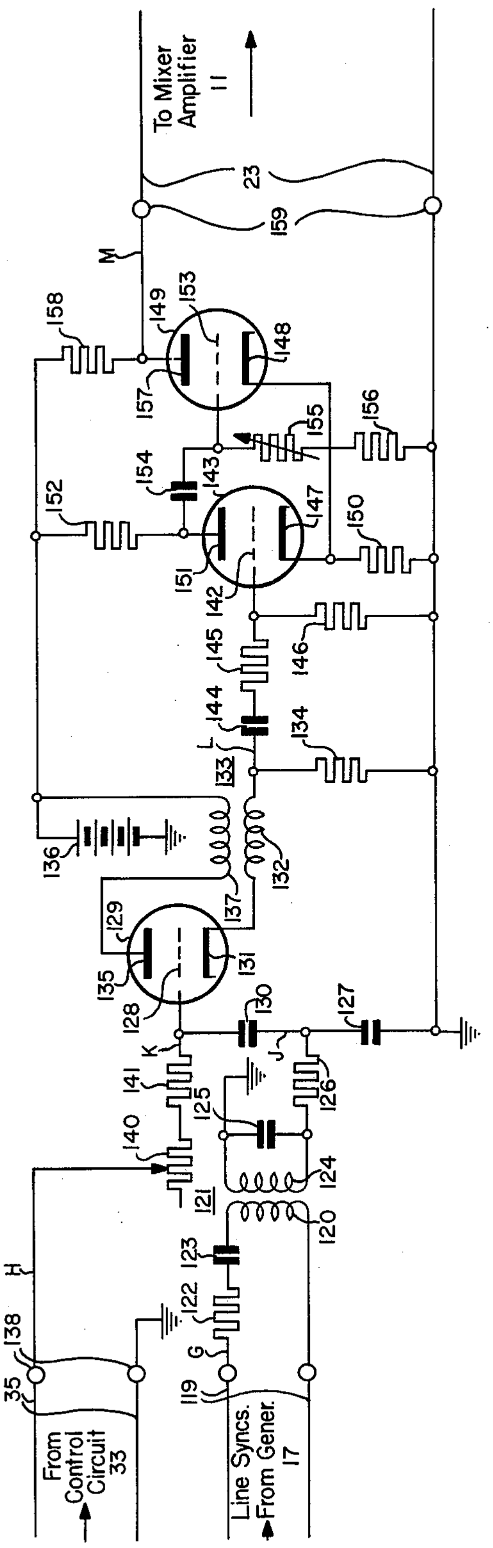
Figures 3A, 4:
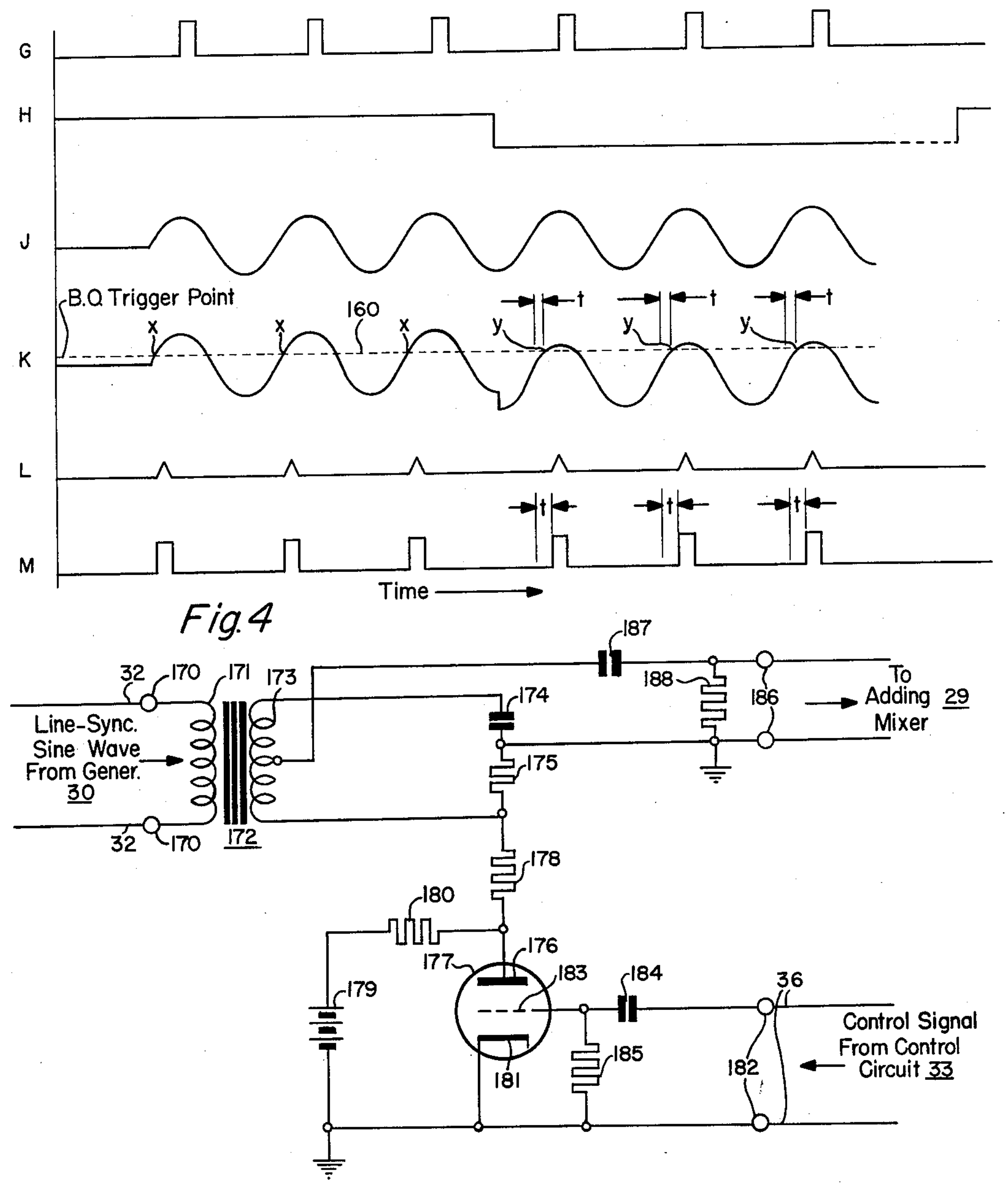

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows a transmitter constructed in accordance with the present invention, Figure 2 is a detailed diagram of one of the components of the transmitter of Figure 1, Figure 2A shows various curves used in explaining the operation of the circuit of Figure 2, Figure 3 is a detailed diagram of another component of the transmitter of Figure 1, Figure 3A shows various curves used in explaining the operation of the circuit of Figure 3, Figure 4 shows a detailed diagram of yet another component of the transmitter of Figure 1, this component being expressly disclosed and claimed in copending application Serial No. 163,223, filed May 20, 1950 in the name of Walter S. Druz entitled Timing System for a Subscription Television System and assigned to the present assignee, issued March 23, 1954 as Patent 2,673,238.

Figure 5:
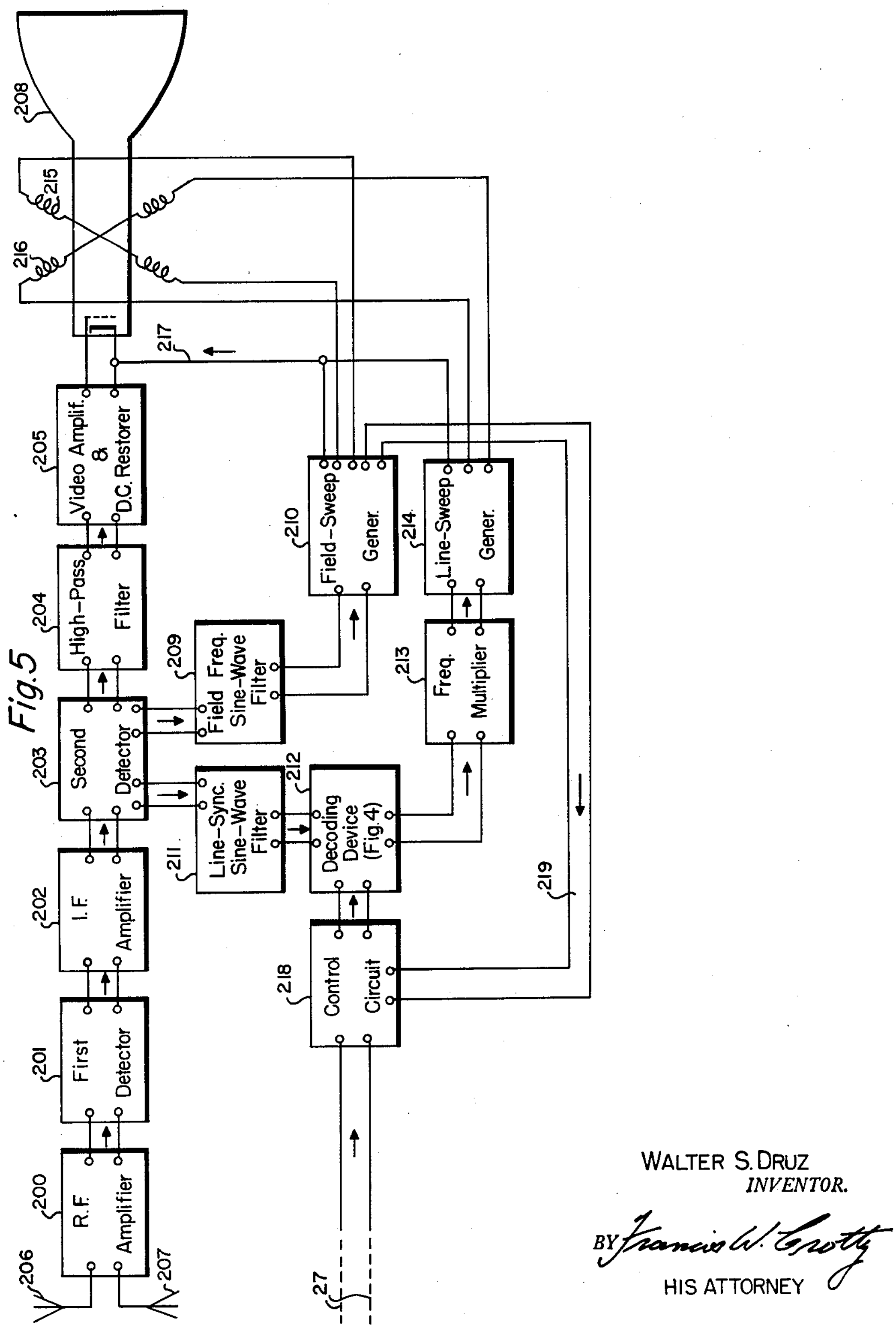

Figure 5 shows a receiver constructed in accordance with the present invention.

Referring now particularly to Figure 1, the subscription transmitter illustrated therein includes a picture-converting device 10 of the iconoscope, image-orthicon or other suitable type which constitutes a video-signal source for supplying a video signal representing a subject scanned in the usual way. The device is connected to a mixer amplifier 11 which, in turn, may be connected to an additional amplifier 12. The output terminals of amplifier 12 are connected to a high-pass filter 13 constructed to translate only those frequency components of the video signal above a preselected frequency, for example, 10 kilocycles. The high-pass filter 13 is connected to a carrier-wave generator and modulator 14 whose output terminals may be connected to a suitable antenna circuit 15, 16. The transmitter also includes a generator 17 for producing field- and line-synchronizing pulses and associated blanking pedestal pulses. Unit 17 is connected to mixer amplifier 11 and supplies thereto line- and field-blanking pulses having an amplitude corresponding substantially to the average amplitude, or "gray" level, of the video signal output of device 10. Unit 17 is also connected to a field-sweep generator 18 and supplies field-synchronizing pulses thereto to control or time its operation and is further connected to a line-sweep generator 19 to supply line-synchronizing pulses to this generator to control its operation. The output terminals of generators 18 and 19 are connected respectively to the field- and line-deflection elements 20, 21 of picture-converting device 10.

Unit 17 is also connected to a clamping-pulse circuit 22, to be described in detail hereinafter, and supplies line-synchronizing pulses to this circuit. The clamping-pulse circuit 22 is connected to mixer amplifier 11 by way of leads 23. Unit 17 is additionally connected to a frequency divider 24 and supplies field-synchronizing pulses thereto. The frequency divider 24 may be of a random type such as disclosed in copending application Serial No. 32,457, Roschke, filed June 11, 1948, issued March 11, 1952 as Patent No. 2,588,413, entitled "Random Frequency Divider," and assigned to the present assignee. The output terminals of frequency divider 24 are connected to a multivibrator 25 of the well known "Eccles-Jordan" type. That is, multivibrator 25 has two stable operating conditions and is triggered between these operating conditions by each frequency-divided pulse from the divider 24. The multivibrator 25 is connected to a key-signal generator 26, and causes this generator to generate a key signal of a preselected frequency during intervals when the multivibrator is in a selected one of its two operating conditions. The output terminals of key-signal generator 26 are connected to a line circuit 27 which may extend to the various subscriber receivers.

The unit 17 is also connected to a field-frequency sine-wave generator 28 and controls this generator to produce a signal having a frequency corresponding to that of the field-synchronizing pulses. The output terminals of generator 28 are connected to an adding mixer 29 of well-known construction that adds linearly the potentials applied thereto. Unit 17 is also connected to a frequency-divider and sine-wave generator 30 which is controlled thereby to generate a signal having a frequency that is some sub-multiple of the repetition frequency of the line-synchronizing pulses. The generator 30 is connected by way of leads 32 to a coding device 31, to be described in detail hereinafter. The line circuit 27 is connected by way of leads 34 to a control circuit 33, presently to be described, and the control circuit is connected to clamping pulse circuit 22 by way of leads 35 and to coding device 31 by way of leads 36. Field-synchronizing pulses are supplied to control circuit 33 by way of leads 37.

A video signal is generated by device 10 during a series of trace intervals separated by retrace intervals, and this signal is delivered to mixer amplifier 11 where it is mixed with line- and field-blanking pulses from generator 17 which are timed to occur during the retrace intervals to produce a form of composite television signal. As previously stated, the amplitude of the blanking components of this signal is substantially equal to the average amplitude of the video components to prevent unauthorized synchronization thereon. At the same time, circuit 22 supplies clamping pulses over leads 23 to mixer amplifier 11 for inclusion in the composite signal. The clamping pulses are timed to appear pedestalled on the line-and field-blanking pulses and the amplitude of the clamping pulses is so adjusted that when pedestalled on the blanking pulses the combined pulses have a peak amplitude corresponding to the "black" level of the composite signal. The composite signal is amplified in amplifiers 11 and 12 and those frequency components of the composite signal above a preselected frequency are translated by the high-pass filter 13, modulated on a suitable picture carrier in unit 14, and radiated by antenna circuit 15, 16. The generator 17 supplies field- and line-synchronizing pulses respectively to generators 18 and 19 to control the field- and line-scansion of device 10 in conventional manner.

The field-frequency sine-wave signal developed by generator 28 is supplied to adding mixer 29. Similarly, the sine-wave signal output of generator 30, having a frequency which is one-half of the line frequency, is supplied to coding device 31 over leads 32, and after being coded in a manner to be described, is supplied to adding mixer 29. The sine-wave signals from coding device 31 and generator 28 are mixed in mixers 29 and supplied to carrier-wave generator and modulator 14 wherein they are modulated on the picture carrier. The highest frequency of these sine-waves is less than the lowest frequency translated by filter 13, and for this reason these sine waves may be conveniently separated from the video components at the subscriber receivers.

To prevent unauthorized receivers from synchronizing on the clamping pulse components of the radiated signal, the timing of the clamping pulses as delivered by clamping circuit 22 is changed under the control of control circuit 33 in a manner to be described and in accordance with the coding schedule of the system. The key-signal generator 26 generates bursts of key signal which represent the coding schedule for application to control circuit 33 by way of leads 34 to cause the control circuit and coding device 31 to be actuated during spaced intervals determined by that schedule. The key signal is supplied to subscriber receivers over line circuit 27 and permits decoding apparatus at these receivers to be actuated in time coincidence with the actuation of the coding mechanism at the transmitter to decode the radiated subscription signal in a manner to be described.

The operation of the control circuit is such that whenever key-signal generator 26 generates a burst of key signal on the line circuit 27, the circuit acts during the vertical retrace intervals following the initiation and termination of such burst to actuate the clamping pulse circuit 22 and the coding device 31. Therefore, the coding device 31 is controlled to impart characteristic variations to the line-synchronizing sine wave only during field-retrace intervals so that any distortion that might occur in the image reproduced by the subscriber receivers should such variations take place during trace intervals is precluded. Moreover, the key-signal generator is actuated to initiate and terminate each burst of key-signal by the frequency-divided field synchronizing pulses from the divider 24, and no change takes place in the line-synchronizing sine wave until the next succeeding vertical retrace intervals. Because of this, and in a manner to be described, slight time delays of the key signal pulse that might occur in the line circuit 27 do not affect the proper operation of the subscriber receivers which are controlled in time coincidence with coding changes at the transmitter.

The control circuit 33, shown in detail in Figure 2, and which is disclosed and claimed in copending application Serial No. 341,681, filed March 11, 1953, in the name of Pierce E. Reeves, and assigned to the present assignee includes a pair of input terminals 50 which are connected to key-signal generator 26 by leads 34. The terminals 50 are connected to the primary winding 51 of a transformer 52, the secondary winding 53 of this transformer being coupled to the control electrode 54 of an electron-discharge device 55 through a coupling capacitor 56 and to ground through a resistor 57. The control electrode 54 is connected to ground through a grid-leak resistor 58 and the cathode 59 is connected to ground through a resistor 60 shunted by a capacitor 61. The anode 62 of device 55 is connected to the positive terminal of a source of unidirectional potential 63 through a load resistor 64, and cathode 59 is connected to this terminal through a resistor 65. The device 55 is connected as an amplifier to amplify the key signal received from generator 26, and in view of the cathode bias provided by the potentiometer arrangement of resistors 60, 65 the amplifier responds only when the amplitude of the key signal exceeds a preselected threshold value.

The anode 62 is coupled to a rectifier device 66 through a coupling capacitor 67. The amplifier is made regenerative by means of a transformer 68. The primary winding 69 of this transformer has one side connected to the junction of the capacitor 67 and rectifier 66, and its other side coupled to this junction through a capacitor 70. The secondary winding 71 of transformer 68 has one side connected to the primary winding and to ground, and its other side connected to the junction of winding 53 and resistor 57. The rectifier 66 is connected to the control electrode 72 of an electron-discharge device 73 through a resistor 74, and the rectifier is connected to ground through a resistor 75 shunted by a capacitor 76. The cathode 77 of device 73 is directly connected to cathode 59 of device 55, and the anode 78 of device 73 is connected to the positive terminal of source 63 through a load resistor 79 and to ground through a resistor 80.

The control circuit of Figure 2 has a second pair of input terminals 81 which are connected to unit 17 by leads 37. One of the terminals 81 is connected to ground and the other is coupled to control electrode 72 of device 73 through series-connected resistor 82 and capacitor 83. The ungrounded terminal 81 is also coupled to anode 78 of device 73 through series-connected resistor 84 and capacitor 85.

The anode 78 is coupled to the control electrode 86 of an electron-discharge device 87 through a capacitor 88, the control electrode being connected to ground through a grid-leak resistor 89. The cathode 90 of device 87 is directly connected to the cathode 91 of an electron-discharge device 92, and these cathodes are connected to ground through a common resistor 93. The anode 94 of device 87 is connected to the positive terminal of source 63 through a resistor 95, and is coupled to the control electrode 96 of device 92 through a capacitor 97, the control electrode being connected to cathodes 90, 91 through a resistor 98. The anode 99 of device 92 is connected to the positive terminal of source 63 through a resistor 100 and to control electrode 86 of device 87 through a resistor 101. The devices 87 and 92 are connected to form a "single shot" multivibrator, and may be triggered from one operating condition to another by pulses of one polarity and returned to the first operating condition by pulses of a second polarity. The construction and operation of this type of multivibrator circuit are well known in the art.

The anode 99 is connected to the control electrode 102 of an electron-discharge device 103 through a limiting resistor 104, the control electrode being connected to ground through a resistor 105. The cathode 106 of device 103 is connected to ground through a cathode resistor 107, and the anode 108 is connected to the positive terminal of source 63 through a resistor 109. The anode 108 is connected to ground through series-connected resistors 110 and 111. The circuit of device 103 acts as a phase inverter to invert the output pulses from the preceding multivibrator and supply these pulses to output terminals 112 and 113, the amplitude of these pulses being adjusted by the movable tap 114 on resistor 111. Output terminals 112 are connected to coding device 31 by leads 36, and terminals 113 are connected to clamping circuit 22 by leads 35.

The operation of the circuit of Figure 2 may best be understood by reference to the various curves of Figure 2A. The field-synchronizing pulses from generator 17 are impressed across terminals 81 and have a wave form shown in curve A. These pulses are supplied to control electrode 72 of device 73 through network 82, 83 and to the junction of anode 78 and resistor 80 through network 84, 85. The bursts of key signal generated by key-signal generator 26 are impressed across terminals 50, and each burst has a wave form as shown in the curve B. The key-signal bursts are amplified in device 55, rectified by device 66 and supplied to control electrode 72 with a wave form as shown in curve C. When the rectified signal of curve C has a maximum negative amplitude, device 73 is rendered non-conductive. In this manner, during the intervals between bursts of key signal, the field-synchronizing pulses are amplified by device 73 and applied to control electrode 86 of device 87 with negative polarity. In addition, the field-synchronizing pulses are applied directly to control electrode 86 by way of network 84, 85 with positive polarity. The amplification of device 73 is, preferably, made such that under these conditions the resultant pulses applied to control electrode 86 have negative polarity and an amplitude substantially equal to that of the field-synchronizing pulses as applied to terminals 81. However, during the occurrence of each burst of key signal, and when the rectified signal of curve C has its maximum negative value, the field-synchronizing pulses are supplied to control electrode 86 only by way of network 84, 85 and with positive polarity. As shown in curve D, the pulses supplied to control electrode 86 are of negative polarity until the occurrence of each burst of key signal, at which time the next succeeding field pulses are of positive polarity. The field-synchronizing pulses applied to control electrode 86 following the termination of each key-signal burst again have negative polarity.

The multivibrator circuit of devices 87, 92 is triggered from one operating condition to the other by the first field-synchronizing pulse succeeding the initiation of each key-signal burst and is returned to its first operating condition by the first field-synchronizing pulse following the termination of each such burst. The multivibrator, therefore, supplies a signal to control electrode 102 of device 103 having a positive-pulse component determined by the key-signal burst as shown in curve E. The device 103 inverts the phase of this positive-polarity pulse and supplies a negative-polarity pulse shown in curve F to output terminals 112, 113 each time the multivibrator circuit is triggered to render device 87 conductive and device 92 non-conductive. The output pulses are applied to and actuate clamping pulse circuit 22 and coding device 31.

The clamping pulse circuit 22, shown in detail in Figure 3, includes a first pair of input terminals 119 which are connected to generator 17 to derive line-synchronizing pulses therefrom. The terminals 119 are connected to the primary winding 120 of a transformer 121 through series-connected resistor 122 and capacitor 123. The secondary winding 124 of transformer 121 is shunted by a capacitor 125, one side of the secondary winding being connected to ground. The other side of the secondary winding 124 is coupled to ground through a phase-shifting network comprising resistor 126 and capacitor 127, the junction of resistor 126 and capacitor 127 being coupled to the control electrode 128 of an electron-discharge device 129 through a capacitor 130. The device 129 is connected as a blocking oscillator and its cathode 131 is connected to ground through a winding 132 of a transformer 133 and a resistor 134. The anode 135 of device 129 is connected to the positive terminal of a source of unidirectional potential 136 through a winding 137 of transformer 133.

The clamping-pulse circuit has a second pair of input terminals 138 connected to control circuit 33 by leads 35. One of terminals 138 is connected to ground and the other is connected to control electrode 128 of device 129 through an adjustable resistor 140 and a resistor 141.

The junction of winding 132 and resistor 134 is coupled to the control electrode 142 of an electron-discharge device 143 through series-connected capacitor 144 and resistor 145, the control electrode being connected to ground through a resistor 146. The cathode 147 of device 143 is directly connected to the cathode 148 of an electron-discharge device 149, these cathodes being connected to ground through a common cathode resistor 150. The anode 151 of device 143 is connected to the positive terminal of source 136 through a resistor 152 and is coupled to the control electrode 153 of device 149 through a capacitor 154. The control electrode 153 is connected to ground through series-connected adjustable resistor 155 and resistor 156, and its anode 157 is connected to the positive terminal of source 136 through a resistor 158. The output terminals 159 of the clamping-pulse circuit are connected to mixer amplifier 11 by leads 23, one of these output terminals being connected to ground and the other to anode 157.

The devices 143 and 149 form a multivibrator circuit which is triggered by the output pulses from the preceding blocking oscillator. The time constant of the multivibrator circuit may be varied by adjustment of resistor 155 in well-known manner. The resistor 155 is adjusted to provide pulses of a desired individual duration across terminals 159.

The operation of the circuit of Figure 3 may best be understood by reference to the curves of Figure 3A. Line-synchronizing pulses from generator unit 17 are impressed across terminals 119 and supplied to primary winding 120 of transformer 121. The secondary winding 124 of the transformer is tuned to the repetition frequency of these pulses by means of capacitor 125, and a sine wave is produced across the secondary winding. This sine wave is phase-shifted in network 126, 127 and, as applied to control electrode 128 of the device 129, is represented by curve J. The control pulses, shown in curve H, from control circuit 33 are impressed across terminals 138 and applied to control electrode 128 through resistors 140 and 141.

The composite signal thus applied to control electrode 128 is shown in curve K and consists of the sine wave of curve J added to the control pulses of curve H. During the intervals between the negative-polarity control pulses of curve H, the blocking oscillator 129 is triggered at a certain point in each cycle of the sine wave which is designated *x* in curve K and which corresponds to the time the signal of curve K increases beyond the blocking oscillator triggering point shown by the broken line 160. The blocking oscillator triggering point may be adjusted by variation of resistor 140 which is in the discharge path of the capacitor 130 and thus determines the time constant of the oscillator. For the duration of each control pulse of curve H, the triggering of the blocking oscillator occurs at a point *y* in each cycle of the signal of curve K. That is, the triggering of the blocking oscillator is delayed by a time "*t*" with respect to the triggering during the intervals between the control pulses. The amplitude of the control pulse of curve H and, hence, the value of the time *t* may be controlled by adjustment of tap 114 on potentiometer 111 of Figure 2.

Each time the blocking oscillator is triggered, a sharp pulse appears across resistor 134 in the cathode circuit of device 129. These pulses are shown in curve L and are applied to the multivibrator circuit of devices 143, 149 which responds and applies output pulses to terminals 159 as shown in curve M. As previously mentioned, the individual duration of each of these pulses may be adjusted by variation of the resistor 155. The pulses of curve M are applied to mixer amplifier 11 and act as clamping pulses in the television signal and this amplitude is such that when pedestalled on the blanking pulses they extend to the black level of the video signal. Moreover, at spaced intervals determined by the control pulses of wave form H, the clamping pulses are shifted by a time interval "*t*" to prevent unauthorized synchronization on these pulses. The phase-shifting characteristic of network 126, 127 and the adjustment of the blocking oscillator triggering point is made such that the clamping pulses of curve M are correctly timed with respect to the blanking pulses so that they appear pedestalled on the blanking pulses in the television signal. Furthermore, resistor 140 is so adjusted that the time displacement "*t*" does not cause the clamping pulses to move off the blanking pulses during the spaced intervals when the clamping pulses are delayed by this time.

The coding device 31 of Figure 1 is shown in detail in Figure 4. This device includes a pair of input terminals 170 connected to sine-wave generator 30 by leads 32. The terminals 170 are connected to the primary winding 171 of a transformer 172. The secondary winding 173 of transformer 172 is shunted by a capacitor 174 series-connected with a resistor 175, the junction of capacitor 174 and resistor 175 being connected to ground. The junction of resistor 175 and winding 173 is connected to the anode 176 of an electron-discharge device 177 through a resistor 178, and the junction of resistor 178 and anode 176 is connected to the positive terminal of a source of unidirectional potential 179 through a resistor 180. The cathode 181 of device 177 is connected to ground, as is the negative terminal of source 179. The coding device also includes a pair of input terminals 182 connected to the control circuit 33 by leads 36. One of the terminals 182 is grounded and the other is coupled to the control electrode 183 of device 177 through a coupling capacitor 184, the control electrode being connected to ground through a grid-leak resistor 185. The output terminals 186 of the circuit are connected to mixer 29. One of the terminals 186 is grounded and the other is coupled to a center tap on winding 173 through a capacitor 187, the junction of the terminal 186 and capacitor 187 being connected to ground through a resistor 188.

The coding device is so adjusted that during the intervals between the negative polarity pulses from the control circuit 33, device 177 is conductive. For this condition, the sine-wave signal from generator 30 applied to winding 171 is phase shifted by an amount determined by network 174, 175 and 178. Therefore, the sine-wave output obtained across terminals 186 has a frequency corresponding to the signal from generator 30, but displaced in phase relative thereto by a predetermined amount. For the duration of each negative polarity control pulse impressed across terminals 182, device 177 is non-conductive, thus increasing the resistance value of the phase shifting network. This causes the sine-wave output derived from terminals 186 to have a shifted phase as compared to its phase during the first described operating condition. The capacitor 187 and resistor 188 form a differentiating circuit for the control pulses impressed across the terminals 182 so that these control pulses may have no deleterious effect on the signal derived from output terminals 186.

Therefore, during spaced operating intervals determined by the control signal from control circuit 33, the phase of the sine-wave signal from generator 30 is shifted by a preselected amount as applied to mixer 29 and is thus coded. As previously mentioned, coding device 31 is fully described in copending application Serial No. 163,223. It is to be understood that the coding device of Figure 4 is merely illustrative and any suitable circuit may be utilized to change a characteristic of the sine-wave signal from generator 30 during spaced intervals determined by the control signal from control circuit 33 which, in turn, is produced in response to the key signal from key-signal generator 26.

A television receiver for use in conjunction with the transmitter of Figure 1 is shown in Figure 5. It includes a radio-frequency amplifier 200 of one or more stages which is connected to a first detector 201. The output terminals of the first detector are connected to an intermediate-frequency amplifier 202 of any desired number of stages, and amplifier 202 is connected to a second detector 203. The output terminals of the second detector are connected through a high-pass filter 204 to a video amplifier and direct-current restorer circuit 205. The input terminals of radio-frequency amplifier 200 may be connected to a suitable antenna circuit 206, 207, and the output terminals of unit 205 are connected to the input electrodes of an image-reproducing device 208. These components of the receiver are of well-known construction and are connected in usual fashion. The high-pass filter 204 has the same pass band as filter 13 of Figure 1, and is constructed to translate only the frequency components of the video signal which exceed the aforementioned preselected frequency.

The second detector 203 is connected to a field-frequency sine-wave filter 209 which, in turn, is connected to a field-sweep generator 210. The filter 209 is constructed to select the field-frequency sine-wave component from the detected video signal to control the field-sweep generator. A line-synchronizing sine-wave filter 211 is also connected to the second detector 203, and its output terminals are connected to a decoding unit 212. The decoding device 212 may be similar in construction to coding device 31 of the transmitter which is shown in detail in Figure 4. The output terminals of decoding device 212 are connected to a frequency multiplier 213 which restores the line-synchronizing sine-wave component to the line frequency of the transmitter. The frequency multiplier 213 is connected to a line-sweep generator 214 and controls the operation of this generator at the line frequency of the transmitter. The output terminals of generators 210 and 214 are connected respectively to the field-deflection elements 215 and line-deflection elements 216 of device 208. Pulses may be obtained from generators 210 and 214 during line and field retrace intervals for application to the input electrodes of device 208 by means of the lead 217, to blank this device during such intervals in well-known manner. The line circuit 27 from the transmitter of Figure 1 is connected to a control circuit 218, and the output terminals of the control circuit are connected to decoding device 212. Field-blanking pulses are derived from the field-sweep generator 210 and supplied to control circuit 218 by way of the leads 219.

The control circuit 218 may be similar in construction to control circuit 33 of Figures 1 and 2. However, since it is desired that the control circuit impart a compensating change to the signal translated by decoding device 212, the phase inverter circuit of device 108 of Figure 2 is not required. In this manner, during intervals when control circuit 33 of the transmitter supplies negative-polarity pulses to coding device 31, control circuit 218 of the receiver supplies positive-polarity pulses to decoding device 212.

The television signal from the transmitter of Figure 1 may be intercepted by antenna circuit 206, 207 and amplified in radio-frequency amplifier 200. The amplified signal is heterodyned to the selected intermediate frequency of the receiver in first detector 201, and the resulting intermediate-frequency signal is amplified in amplifier 202. The signal is then detected in second detector 203 and the resulting composite video signal is impressed on high-pass filter 204. The filter 204 translates only the frequency components of the video signal exceeding the aforementioned predetermined frequency and, thus, discriminates aginst the synchronizing components of the composite video signal which, as previously discussed, have frequencies below the predetermined frequency. The video signal from filter 204 is amplified in video amplifier 205, which may include any known type of direct-current restoration circuit for effectively reinserting the low-frequency components of the video signal by stabilizing that signal on its clamping pulses. The amplified video signal from amplifier 205 is applied to the input electrodes or reproducing device 208 and controls the intensity of the cathode-ray beam therein in well-known fashion. The direct-current restoration circuit of the amplifier 205 acts on the peaks of the clamping pulses which extend to the black level. It has been found that direct-current restoration circuits operate satisfactorily to restore the low-frequency components of the video signal up to approximately 1500 cycles. For this reason, it is preferable, that the lowest frequency picture component of the radiated video signal be substantially 10 kilocycles, and the filters 13 and 204 be constructed to discriminate against signal frequencies below 10 kilocycles. In addition, under these conditions, the synchronizing components of the television signal are given frequencies below 10 kilocycles.

The field-frequency component of the video signal is selected from the second detector by means of filter 209. In accordance with present-day standards, this signal has a frequency of 60 cycles and, preferably, is in the form of a sine-wave. However, when so desired, both the field- and line-synchronizing components of the video signal may have other selected wave forms. The field-frequency signal from filter 209 is used to control the operation of the field-sweep generator 210 in well-known fashion. In this manner, the field scansion of device 208 is synchronized with the field scansion of device 10 at the transmitter.

The line-synchronizing sine-wave filter 211 selects the line-synchronizing signal component from the composite video signal. It is preferable that this component have a frequency that is some sub-multiple of the line-synchronizing frequency of the transmitter. This is because present-day standards require that the line-synchronizing frequency be of the order of 15750 cycles and, as previously mentioned, it is desirable that the synchronizing components of the television signal have a frequency below 10 kilocycles. The line-synchronizing signal component from filter 211 is supplied to decoding device 212 wherein compensating phase changes are imparted by means of control circuit 218.

The control circuit 33 at the transmitter acts to impart a phase change to the line-synchronizing signal component during the field retrace intervals following the initiation and termination of each burst of key signal on line circuit 27. The control circuit 218 is similar in construction to control circuit 33 and derives field-blanking pulses from field-sweep generator 210 to impart a compensating phase change in the line-synchronizing signal component in time coincidence with the phase changes at the transmitter. It may, therefore, be stated that the line-synchronizing signal component is effectively decoded in the decoding device 212.

The decoded line-synchronizing signal component from decoding 212 is frequency-multiplied in device 213 to the line-scanning frequency of device 10 at the transmitter. The signal from device 213 controls the operation of line-sweep generator 214 at the required line frequency, and generator 214, in turn, controls the line scansion of reproducing device 208. The receiver of Figure 5 may, therefore, accurately decode and reproduce the subscription television signal transmitted by the transmitter of Figure 1.

This invention provides a subscription system in which a television signal is coded with a high degree of complexity, yet one which requires relatively simple and uncomplicated apparatus at the subscriber receivers to effect decoding. Moreover, transmitter efficiency is increased in the present system since the synchronizing components are not transmitted with peak amplitudes extending beyond the maximum amplitude of the video components as is standard practice. Because of this, there is no need for the transmitter of the present ssytem to have the peak power capabilities of those of standard systems.

Since the scanning functions of picture converter device 10 at the transmitter are not disturbed during the coding process, the coding of the television signal may be accomplished at some point remote from its source. That is, the device may be replaced by an incoming video signal derived from a remote locality in uncoded form, and coded by the apparatus of Figure 1 for re-transmission to the surrounding area.

While a particular embodiment of the invention has been shown and described, modifications may be made and it is intended in the appended claims to cover all such modifications as fall within the true spirit and scope of the invention.

I claim:

1. A subscription type of television transmitter comprising: a source for producing video signals having components within a given frequency range, said components occurring during a series of trace intervals separated by retrace intervals; a clamping signal source for producing clamping pulses during said retrace intervals having a fixed amplitude value; means, including a high-pass filter having a low-frequency cut-off point within said frequency range, coupled to said sources for developing a composite signal including video components and clamping components; means coupled to said clamping signal source for varying the timing of said clamping pulses within said retrace intervals in accordance with a coding schedule; a synchronizing-signal generator coupled to said video source for determining said trace intervals and for developing a continuous wave synchronizing component related to the timing of said trace intervals and having a frequency less than said cut-off point of said filter; and means coupled to said generator for adding said synchronizing component to said composite signal to obtain a subscription signal for radiation to subscriber receivers.

2. A subscription type of television transmitter comprising: a source for producing video signals having components within a given frequency range, said components occurring during a series of trace intervals separated by retrace intervals; a clamping signal source for producing clamping pulses during said retrace intervals having a fixed amplitude value; means, including a high-pass filter having a low-frequency cut-off point within said frequency range, coupled to said sources for developing a composite signal including video components and clamping components; means coupled to said clamping signal source for varying the timing of said clamping pulses within said retrace intervals in accordance with a coding schedule; a synchronizing-signal generator coupled to said video source for determining said trace intervals and for developing a continuous wave synchronizing component related to the timing of said trace intervals and having a frequency less than said cut-off point of said filter; coding means for varying a timing characteristic of said synchronizing component in accordance with a coding schedule; and means coupled to said coding means and to said generator for adding said synchronizing component to said composite signal to obtain a subscription signal for radiation to subscriber receivers.

3. A subscription type of television transmitter comprising: a source for producing video signals having components within a given frequency range, said components occurring during a series of trace intervals separated by retrace intervals; a clamping signal source for producing clamping pulses during said retrace intervals having a fixed amplitude value; means, including a high-pass filter having a low-frequency cut-off point within said frequency range, coupled to said sources for developing a composite signal including video components and clamping components; means coupled to said clamping signal source for varying the timing of said clamping pulses within said retrace intervals in accordance with a coding schedule; a synchronizing-signal generator coupled to said video source for determining said trace intervals and for developing a continuous wave synchronizing component related to the timing of said trace intervals and having a frequency less than said cut-off point of said filter; coding means for varying a timing characteristic of said synchronizing component in accordance with a coding schedule; means coupled to said coding means and to said generator for adding said synchronizing component to said composite signal to obtain a subscription signal for radiation to subscriber receivers; and a key-signal generator for producing a key signal indicating said last-mentioned coding schedule for transmission to said subscriber receivers over a line circuit.

4. A subscription type of television transmitter comprising: a source for producing video signals having components within a given frequency range, said components occurring during a series of trace intervals separated by retrace intervals; a clamping signal source for producing clamping pulses during said retrace intervals having a fixed amplitude value; means, including a high-pass filter having a low-frequency cut-off point within said frequency range, coupled to said sources for developing a composite signal including video components and clamping components; means coupled to said clamping signal source for varying the timing of said clamping pulses within said retrace intervals in accordance with a coding schedule; a synchronizing-signal generator coupled to said video source for determining said trace intervals and for developing a sine-wave synchronizing component related to the timing of said trace intervals and having a frequency less than said cut-off point of said filter; and means coupled to said generator for adding said synchronizing component to said composite signal to obtain a subscription signal for radiation to subscriber receivers.

5. A subscription type of television transmitter comprising: a source for producing video signals having components within a given frequency range, said components occurring during a series of trace intervals separated by retrace intervals; a clamping signal source for producing clamping pulses during said retrace intervals having a fixed amplitude value; means, including a high-pass filter having a low-frequency cut-off point within said frequency range, coupled to said sources for developing a composite signal including video components and clamping components; a synchronizing-signal generator coupled to said video source for determining said trace intervals and for developing a sine-wave synchronizing component related to the timing of said trace intervals and having a frequency less than said cut-off point of said filter; a coding device for varying a timing characteristic of said synchronizing component; a control circuit coupled to said clamping signal source and to said coding device for varying the timing of said clamping pulses and said synchronizing component in accordance with a coding schedule; means coupled to said coding device and to said generator for adding said synchronizing component to said composite signal to obtain a subscription signal for radiation to subscriber receivers; and a key-signal generator for producing a key signal indicating said last-mentioned coding schedule for transmission to said subscriber receivers over a line circuit.

6. A subscription type of receiver for utilizing a coded television signal having video components all of which exceed a preselected frequency level and occur in recurring trace intervals, having clamping components of a fixed amplitude value occurring during interposed retrace intervals, and further having a continuous wave synchronizing component of a frequency below said preselected level and coded in accordance with a coding schedule, said receiver comprising: an image-reproducing device and an associated scanning system; apparatus including a high-pass filter having a cut-off point substantially at said preselected level for translating only said video components and said clamping components to said reproducing device; a direct-current restoration circuit interposed between said apparatus and said reproducing device for stabilizing said video components with respect to said clamping components; a filter selective to the frequency of said continuous wave synchronizing component for selecting said synchronizing component from said television signal and for supplying said component to said scanning system; and decoding apparatus interposed between said last-mentioned filter and said scanning system for decoding said synchronizing component.

7. A subscription type of receiver for utilizing a coded television signal having video components all of which exceed a preselected frequency level and occur in recurring trace intervals, having clamping components of a fixed amplitude value occurring during interposed retrace intervals, and further having a sine-wave synchronizing component of a frequency below said preselected level and coded in accordance with a coding schedule, said receiver comprising: an image-reproducing device and an associated scanning system; apparatus including a high-pass filter having a cut-off point substantially at said preselected level for translating only said video components and said clamping components to said reproducing device;

a direct-current restoration circuit interposed between said apparatus and said reproducing device for stabilizing said video components with respect to said clamping components; a filter selective to the frequency of said sine-wave synchronizing component for selecting said synchronizing component from said television signal and for supplying said component to said scanning system; and decoding apparatus interposed between said last-mentioned filter and said scanning system for decoding said synchronizing component.

8. A subscription type of receiver for utilizing a coded television signal having video components all of which exceed a preselected frequency level and occur in recurring trace intervals, clamping components of a fixed amplitude value occurring during interposed retrace intervals, and a continuous wave synchronizing component of a frequency below said preselected level and coded in accordance with a coding schedule, and for further utilizing a key signal received concurrently with said television signal indicating said coding schedule, said receiver comprising: an image-reproducing device and an associated scanning system; apparatus including a high-pass filter having a cut-off point substantially at said preselected level for translating only said video components and said clamping components to said reproducing device; a direct-current restoration circuit interposed between said apparatus and said reproducing device for stabilizing said video components with respect to said clamping components; a filter selective to the frequency of said continuous wave synchronizing component for selecting said synchronizing component from said television signal and for supplying said component to said scanning system; and decoding apparatus interposed between said last-mentioned filter and said scanning system responsive to said key signal for decoding said synchronizing signal.

9. A subscription type of television system including a transmitter and a receiver, said transmitter comprising: a source for producing video signals having components within a given frequency range, said components occurring during a series of trace intervals separated by retrace intervals; a clamping signal source for producing clamping signal pulses during said retrace intervals having a fixed amplitude value; means, including a high-pass filter having a low-frequency cut-off point within said frequency range, coupled to said sources for developing a composite signal including video components and clamping components; means coupled to said clamping signal source for varying the timing of said clamping pulses within said retrace intervals in accordance with a coding schedule; a synchronizing-signal generator coupled to said video source for determining said trace intervals and for developing a continuous wave synchronizing component related to the timing of said trace intervals and having a frequency less than said cut-off point of said filter; and means coupled to said generator for adding said synchronizing component to said composite signal to obtain a subscription signal for radiation to said receiver; said receiver comprising: an image-reproducing device and an associated scanning system; apparatus including a high-pass filter for translating only said video components and said clamping components to said reproducing device; a direct-current restoration circuit interposed between said apparatus and said reproducing device for stabilizing said video components with respect to said clamping components; and a filter selective to the frequency of said continuous wave synchronizing component for selecting said synchronizing component and for supplying said component to said scanning system.

References Cited in the file of this patent

UNITED STATES PATENTS

| | | |
|---|---|---|
| 2,231,971 | Tubbs | Feb. 18, 1941 |
| 2,305,864 | Gottier | Dec. 22, 1942 |
| 2,310,197 | Hansell | Feb. 2, 1943 |
| 2,451,640 | Thalner | Oct. 19, 1948 |
| 2,606,247 | Fyler | Aug. 15, 1952 |
| 2,619,530 | Roschke | Nov. 25, 1952 |